United States Patent [19]

Bosch et al.

[11] 4,317,236

[45] Feb. 23, 1982

[54] LASER DIGITAL TRANSMITTER

[75] Inventors: Fridolin L. Bosch, Bethlehem; Gay L. Dybwad, Emmaus; Clarence B. Swan, Allentown, all of Pa.

[73] Assignee: Bell Telephone Laboratories, Incorporated, Murray Hill, N.J.

[21] Appl. No.: 123,953

[22] Filed: Feb. 25, 1980

[51] Int. Cl.$^3$ .................................................. H01S 3/18
[52] U.S. Cl. ..................................... 455/608; 455/611;
 455/613; 357/19; 332/7.51
[58] Field of Search .............. 455/611, 610, 608, 609,
 455/613; 357/19, 17; 307/311, 312; 332/7.51;
 331/94.5 H, 94.5 M; 370/1-3

[56] References Cited

U.S. PATENT DOCUMENTS

| | | | |
|---|---|---|---|
| 3,614,447 | 10/1971 | Paoli et al. | 455/611 |
| 3,617,932 | 11/1971 | Paoli et al. | 357/19 |
| 3,641,459 | 2/1972 | Paoli et al. | 357/19 |
| 4,006,304 | 2/1977 | Sell | 455/608 |

FOREIGN PATENT DOCUMENTS 2330310  1/1975  Fed. Rep. of Germany ...... 455/611

OTHER PUBLICATIONS

Vanderwall et al., "Suppression of Some Artifacts of Modal Noise in Fiber Optic Systems", vol. 4, No. 9, pp. 295-296, Sep. 1979, Optics Letters.

Epworth, "The Phenomenon of Modal Noise in Analogue and Digital Optical Fibre Systems", pp. 492-501, Sep. 1978, Proc. of the Four European Conf. on Optical Comm.

*Primary Examiner*—Robert L. Richardson
*Assistant Examiner*—Edward L. Coles
*Attorney, Agent, or Firm*—Lester H. Birnbaum

[57] ABSTRACT

A system for improving performance of lasers in optical digital systems. This is accomplished by superimposing a microwave modulation current on the normal digital signal input. In the case of single mode lasers, this results in essential elimination of modal noise without any eye margin degradation. In the case of multimode lasers, the superimposed signal obviates various nonlinearities in the light output versus current characteristic which can cause eye margin degradation.

14 Claims, 4 Drawing Figures

LASER DIGITAL TRANSMITTER

BACKGROUND OF THE INVENTION

This invention relates to digital optical communications systems and, in particular, to a laser transmitter with improved optical performance for use in such systems.

In digital optical communications systems, freedom from noise which distorts the detected signal is of prime concern. Where the light is highly coherent, as where a laser operates in a single mode, a persistent problem has been the presence of modal noise. This is caused by destructive interference effects produced in the optical transmission media up to and including the detector end as a result of the light following different paths. The resulting signal will thus often evidence sharp drops in amplitude during a pulse producing low value eye margins and possible errors in the signal. Microwave modulation has been employed in analog optical systems for reducing modal noise (see, Vanderwall et al., "Suppression of Some Artifacts of Modal Noise in Fiber-Optic Systems," *Optics Letters*, September 1979, Vol. 4, No. 9, pages 295-296. However, a significant noise penalty was incurred. It is desirable to eliminate modal noise without incurring other noise penalties which result in eye margin degradation.

In systems where a multimode laser is utilized modal noise is not a problem. However, such lasers frequently exhibit discontinuities at certain portions of their light output versus current characteristics which result in low frequency noise when the lasers are operated in these regions. Rather than resulting from any interference effects, such noise results from the characteristics of the laser itself such as deep level traps, growth defects in the crystal, etc. The ultimate result is again a degradation in eye margins of the detected signal at the receiver end of the system.

It is therefore a primary object of the invention to increase the performance of lasers in digital optical systems thereby achieving large eye margins for the detected signals.

SUMMARY OF THE INVENTION

This and other objects are achieved in accordance with the invention. The transmitter of the present invention includes a solid state injection laser, and means for applying a digital signal to the laser to produce a digital light output. The invention is characterized by means for applying a microwave modulation current of substantially higher frequency superimposed on the digital signal so as to reduce the noise effect in the received light signal and achieve large eye margins. In a preferred embodiment, the microwave frequency is at least ten times the pulse rate of the digital signal and its amplitude is no more than the signal amplitude.

BRIEF DESCRIPTION OF THE DRAWING

These and other features of the invention are delineated in detail in the following description. In the drawing.

It should be realized that these figures are for illustrative purposes and are not drawn to scale.

DETAILED DESCRIPTION

Figure 1:
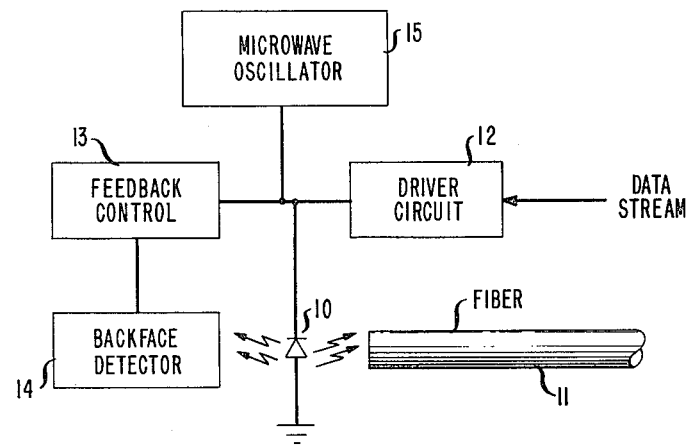
FIG. 1 is a schematic diagram of a two-level laser digital transmitter in accordance with one embodiment of the invention.

A laser transmitter for fiber optics communications in accordance with one embodiment of the invention is illustrated schematically in FIG. 1.

A solid state injection laser, 10, provides the light output. This laser can either be a single mode or multimode laser. In the context of this application, it will be understood that a single mode laser is one where at least 25 percent of the emitted light is concentrated in a single narrow region of the spectrum. A multimode laser refers to a laser which emits light at several wavelengths (at least 5), no one of which has as much as 25 percent of the light power. In one example, a standard single mode GaAS-AlGaAs heterostructure laser diode was employed. This laser typically has an n-type GaAs substrate and successive layers of p- or n-type AlGaAs with at least one p-n junction formed between successive layers. Commercially available lasers manufactured by Hitachi, Mitsubishi and Nippon Electric designated, respectively, HLP 1500, ML 2205F, and NDL 3108P, were utilized. The light output in one example had a wavelength of 8300 Angstroms. In close proximity to one face of the laser was an optical fiber 11 for carrying the light output.

Figure 2:
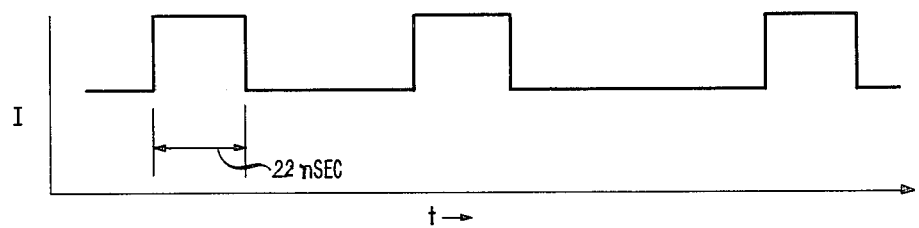
FIG. 2 is an illustration of a typical digital signal combined with a dc laser bias in accordance with the same embodiment.

In accordance with standard laser transmitters, the input data stream was applied to a standard driver circuit 12 which supplied the digital information signal to the laser. The magnitude of a portion of a typical signal combined wih a dc bias is illustrated in FIG. 2. This particular transmitter was operated at a data rate of 45 megabits per second. Thus, the width of a pulse was typically approximately 22 nanoseconds. The amplitude for the ON level was approximately 100 milliamps. The bias current for establishing the off level of the output signal was applied to the laser by a combination of a standard feedback control circuit 13 and detector 14 located at the back face of the laser. This allows the off level to be adjusted for temperature and aging changes in the laser. (For the sake of simplicity, it is assumed that for the portion of the operation discussed, the bias current remains constant. A typical magnitude of such a current is 80 milliamps.)

Figure 3:
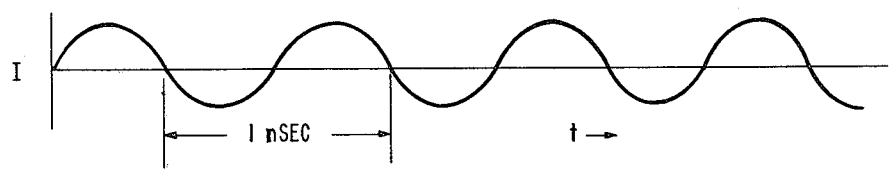
FIG. 3 is an illustration of a typical microwave modulation current in accordance with the same embodiment.

In accordance with the main feature of the invention, a microwave modulation current was superimposed on the digital information signal. The microwave current was supplied by a standard microwave oscillator, 15, which in this case was a Hewlett Packard HP8620A sweep oscillator. In commerical use, a single-transistor oscillator would be used. Any form of microwave oscillator can be employed. In this particular example, as shown in FIG. 3, the current had a constant frequency of 1 GHz and a peak current amplitude of approximately 5 milliamps. This frequency may be varied, and a recommended range is 500 MHz-3 GHz. Frequencies outside the range might be useful in special cases depending upon the system. However, frequencies of 500 MHz or below for our system only partially reduced noise, while frequencies above 3 GHz might not permit proper laser modulation. Preferably, the frequency of the microwave current is at least ten times the pulse rate of the digital signal, although in some systems, a ratio as low as 5 to 1 may be utilized. A recommended range of amplitude is 30-100 percent of the peak amplitude of the digital signal (exclusive of the bias current). If desired, means may be provided for synchronizing the microwave signal with the driver circuit to avoid possible turn on or turn off jitter. We have not found such a feature necessary for effective operation of the system.

Figure 4:
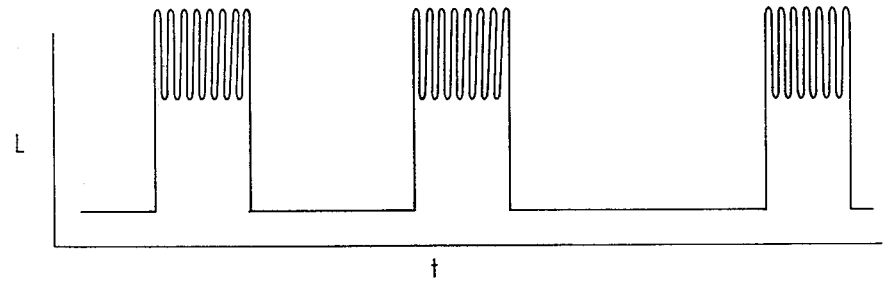
FIG. 4 is an illustration of a typical digital light output of the laser in accordance with the same embodiment.

An approximate representation of the resulting light output signal is illustrated in FIG. 4. It will be noted that the digital output essentially follows the signal from driver current 12, but the ON state is amplitude-and-wavelength-modulated by the superimposed microwave current. The average amplitude of the light pulse was approximately 1 milliwatt and varied between 0.7 and 1.3 milliwatts. Since the wavelength of emitted light varies with the input current, the wavelength modulation in the ON state also resulted from the superimposed microwave signal. The wavelength spectrum of the 8300 Angstrom output light in the ON state was broadened by approximately one Angstrom. It is not certain why the OFF state of the light output was not affected. Such a result could be due to the fact that the bias current was sufficiently below the lasing threshold. It is also possible that the periods that the microwave current exceeded threshold were too short to effect turn-on of the laser. In any event, should laser turn-on during the off state be a problem for some systems, an appropriate remedy would be to use the digital signal to gate the microwave current.

This superimposed microwave current was found to essentially completely eliminate the sharp drops in amplitude of the light output pulses which had resulted from modal noise in prior art single mode laser transmitters. Elimination of modal noise is apparently due to the loss of coherence of the light pulse produced by the microwave frequency modulation which prevents destructive interference in the transmission path. The amplitude modulation resulting from the microwave current apparently is also a factor in eliminating modal noise since it reduces the likelihood that two waves will arrive at the receiver with corresponding amplitudes even if they should be sufficiently coherent to result in destructive interference.

The virtual elimination of modal noise was also confirmed by studying the eye margin of the detected light signal. "Eye margin", as known in the art, is a measure of the ability of the system to descriminate between "ones" and "zeros" for all possible signal sequences. It is the percentage range over which the decisional level can be varied without incurring errors exceeding a specified rate. For the single mode laser of this example, the eye margin for a received signal power of −48.5 dBm and an error rate of $10^{-7}$ fell to as low as 36 percent without the microwave signal. However, the margin was maintained at 51 percent when the signal was applied in accordance with the invention. In general, an eye margin of at least 40 percent is desirable. By comparison of eye margins of such lasers exhibiting modal noise to eye margins of wide spectrum lasers without modal noise it was determined that application of the microwave signal in accordance with the invention resulted in no measurable performance penalty. That is, the eye margins of the former were at least as large as the latter and so the microwave signal could be applied continuously without degradation in the light output. This may be contrasted with the noise penalty reported when a microwave current was applied to an analog optical system. (See Vanderwall, "Suppression of Same Artifacts of Modal Noise in Fiber-Optic Systems," *Optics Letters*, Vol. 4, No. 9, pp. 295-296 (September 1979).)

The use of the microwave modulation current is not limited to the elimination of modal noise. Just as this modulation can essentially eliminate transmission interference effects such as modal noise, it is also expected to alleviate problems caused by optical reflections back to the laser. Further, the signal may be used to improve the performance of digital systems in general where some characteristic of the laser itself results in low frequency noise, self pulsations or pattern dependent outputs which reduce eye margins of the detected signal.

Thus, various multimode lasers exhibiting some discontinuity in their light v. current characteristic were employed in the system of FIG. 1. In one example, the laser was $12\mu$ stripe proton bombardment double heterostructure laser comprising four epitaxial layers formed of an n+ type GaAs substrate. These layers were, successively, n-type AlGaAs with 36 percent aluminum, n- or p-type AlGaAs with 8 percent aluminum, p-type AlGaAs with 36 percent aluminum, and p+ type GaAs. See Pannish and Casey, *Heterostructure Laser Part B*, pages 208-210 and FIG. 7.6-2 (Academic Press 1978). This laser produced approximately 10-15 modes at wavelengths ranging from 8210 to 8250 Angstroms. Such lasers sometimes exhibit a slope discontinuity or an area of steep slope on their light output v. current characteristics which is referred to as a light jump. Operation of the laser at a current within or near the light jump region results in low frequency noise which is often excessive, thus resulting in an unstable light output. This instability can even cause total eye closure in the detected signal in extreme cases. In this particular example, such total closure was produced.

However, when a microwave modulation current with a constant frequency of 1.3 GHz and an amplitude of approximately 5 milliamps was applied, the eye margin was increased to 44.5%. Thus, it was demonstrated that application of a microwave current to multimode lasers could also result in significant improvement of optical performance. It is believed that this is due to the fact that the superimposed microwave signal sweeps the laser through discontinuities in its output characteristics in a time short as compared to the time constants associated with these discontinuities. It should be realized that this is offered only as a possible explanation and the full effects of the microwave signal are as yet not entirely understood.

As in the case of the single mode laser, it appears that microwave signals having frequencies within the range of 500 MHz-3 GHz and at least ten times the pulse rate of the digital signal are preferred. Again, frequencies outside this range might be useful in special cases. A useful amplitude range appears to be 10-100 percent of the peak amplitude of the digital signal (exclusive of the dc bias) for obviating the effects of nonlinearities in the light output characteristics.

It should be realized that although the invention has been described in relation to a two level optical digital system, it is also applicable to multi-level optical digital systems.

Various additional modifications will become apparent to those skilled in the art. All such variations which basically rely on the teachings through which the invention has advanced the art are properly considered within the spirit and scope of the invention.

We claim:

1. A method for operating a single mode solid state injection laser to produce a digital light output in a fiber optic system comprising the step of applying to said laser a signal in the form of pulses including the desired digital information, characterized in that a microwave modulation current having a frequency at least five times the pulse rate of the digital signal is superimposed on said digital signal to essentially eliminate modal noise from the light output in the fiber.

2. A method for operating a multimode solid state injection laser to produce a digital light output comprising the step of applying to said laser a signal in the form of pulses including the digital information, characterized in that a microwave modulation current having a frequency at least five times the pulse rate of the digital signal is superimposed on said digital signal so as to reduce noise associated with nonlinearities in the laser output.

3. A method for operating a solid state laser (10) to produce a digital light output comprising the step of applying to said laser a signal in the form of pulses including the desired digital information, characterized in that a microwave modulation current having a frequency at least five times the pulse rate of the digital signal is superimposed on said signal to increase the eye margin of the detected light output.

4. The method according to claim 3 wherein the laser is a single mode laser.

5. The method according to claim 3 wherein the laser is a multimode laser.

6. The method according to claim 3 wherein the microwave current has a frequency in the range 500 MHz-3 GHz and an amplitude in the range 10-100 percent of the peak amplitude of the digital signal.

7. The method according to claim 3 wherein a bias current is also applied to said laser to establish an off state for said digital output.

8. The method according to claim 7 wherein the bias current and frequency of the microwave current are chosen so as not to affect the off state of the digital light output.

9. A laser digital transmitter comprising a solid state multimode injection laser (10) and means (12) for applying a digital signal to said laser to produce a digital light output, characterized in that said transmitter further comprises means (15) for providing a microwave modulation current superimposed on said digital signal and having a frequency at least five times the pulse rate of the digital signal so as to reduce the effects of noise associated with nonlinearities in the laser output.

10. The device according to claim 9 wherein the microwave current has a frequency in the range 500 MHz-3 GHz and an amplitude in the range of 10-100 percent of the peak amplitude of the digital signal.

11. The device according to claims 1 or 9 further comprising means (13 and 14) for applying a bias current to said laser to establish an off state for said digital light output.

12. The device according to claim 11 wherein the bias current and frequency of the microwave current are chosen so as not to affect the off state of the digital light output.

13. In a laser fiber optic digital system, a transmitter comprising a solid state single mode injection laser (10), and means (12) for applying a digital signal to said laser to produce a digital light output, characterized in that said transmitter further comprises means (15) for providing a microwave modulation current superimposed on said digital signal and having a frequency at least five times the pulse rate of the digital signal such as to essentially eliminate modal noise in said system.

14. The device according to claim 13 wherein the microwave current has a frequency in the range 500 MHz-3 GHz and an amplitude in the range 30-100 percent of the peak amplitude of the digital signal.

* * * * *